INVENTOR
RAYMOND W. WARREN
BY Harry M. Saragovitz,
Edward J. Kelly, Herbert Berl
& J. D. Edgerton
ATTORNEYS

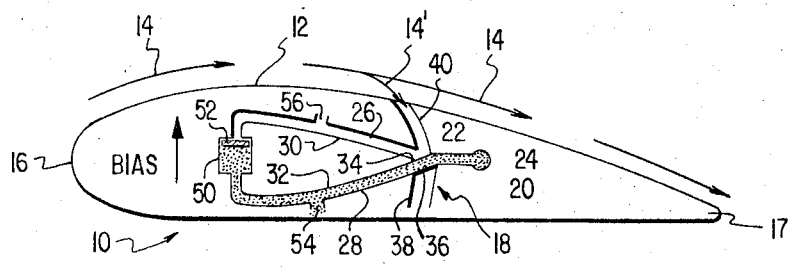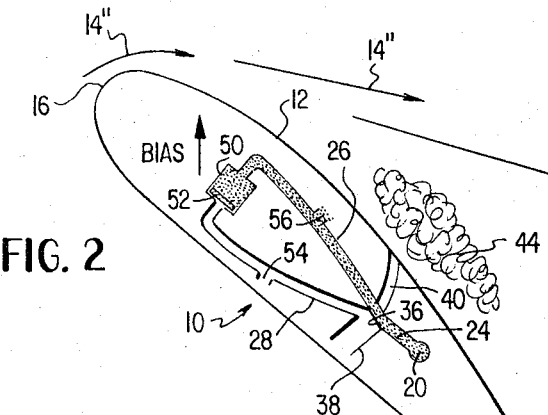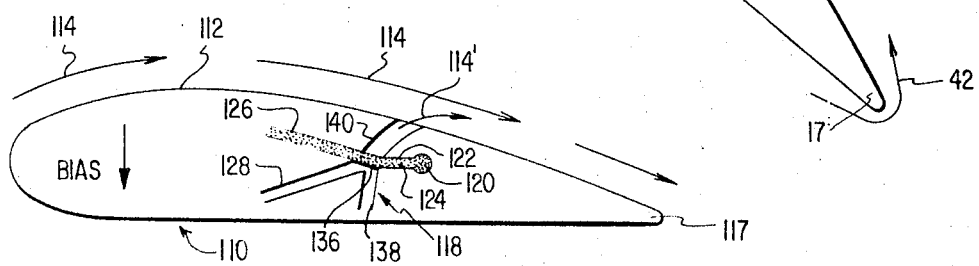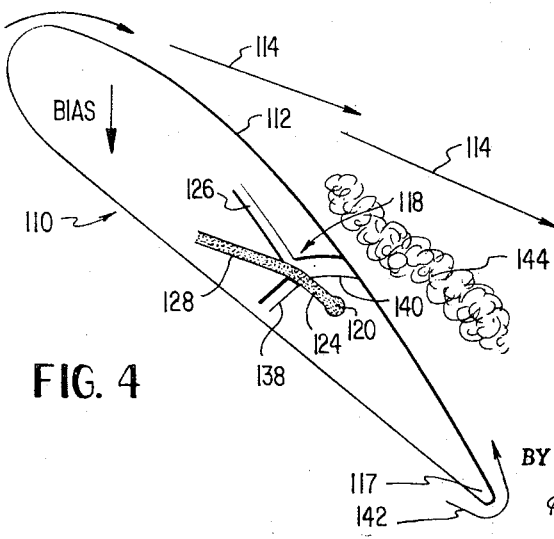

United States Patent Office 3,452,707
Patented July 1, 1969

3,452,707
PURE FLUID AMPLIFIER AS STALL OR SHOCK SENSOR
Raymond W. Warren, McLean, Va., assignor to the United States of America as represented by the Secretary of the Army
Filed Nov. 14, 1966, Ser. No. 594,214
Int. Cl. G01f 15/06
U.S. Cl. 116—117                    9 Claims

ABSTRACT OF THE DISCLOSURE

A shock wave sensing system to detect the presence of a stalled condition on an aerodynamic surface using a biased pure fluid amplifier. The fluid amplifier includes a pair of fluid outlets to receive the amplifier power stream and two control channels positioned on either side of the amplifier inter-action chamber to direct a power stream into one of the amplifier outlets. One control channel biases the power stream through one amplifier outlet while the other control channel is coupled to the high velocity fluid moving past the aerodynamic surface, and whereby as a result of pressure changes control fluid from this control channel will overcome the biasing to cause the power stream to switch to the other amplifier outlet as an indication of either shock or stall.

---

This invention relates to pure fluid amplifiers, and more particularly, to their application in the fields of sensing stall on an aerodynamic surface or the presence of a shock wave in a compressible fluid.

Stall on an aerodynamic surface, such as a wing or turbine rotor blade, is characterized by a separation of fluid flow from the surface and frequently by a complete reversal of flow or turbulence. When the high velocity fluid is used to support an aircraft during flight, it is extremely important to the pilot of the aircraft to know when the attitude of a wing or other aerodynamic surface reaches the stall point, since, in effect, it is at this point that the normal lift function of the aerodynamic surface ceases. In the past, fluid pressure and/or electrical devices, including fluid velocity operated switches have been employed to indicate to the pilot the presence of stall conditions. These devices, in the past, have tended to be unreliable, complex and costly.

It is also important to provide an accurate and immediate indication of the presence of a shock wave in the environment of a compressible fluid. Where an object encounters an oblique shock, the shock wave is characterized by the supersonic flow changing direction, while in the presence of normal shock, the supersonic velocity of the compressive fluid abruptly decreases to Mach 1 with a consequent rise in pressure. Again, conventional means for detecting the presence of either a normal shock wave or an oblique shock wave have tended to be complicated, unreliable, and have not been sufficiently flexible to meet the various needs requiring the same.

It is, therefore, a primary object of this invention to provide an improved stall sensor which employs a simplified pure fluid amplifier for easily and cheaply sensing the stall condition of an aerodynamic surface.

It is a further object of this invention to provide an improved stall sensor, which is characterized by the absence of moving parts, and is actuated directly by the high velocity fluid passing along the aerodynamic surface itself.

It is a further object of this invention to provide an improved stall sensor of this type which allows maximum ease in adjustment, which provides maximum reliability and requires minimum maintenance.

It is a further object of this invention to provide a simple, low cost sensor for detecting either the presence of a normal shock or an oblique shock wave within a compressible fluid.

It is a further object of this invention to provide an improved stall or shock wave detecting means for an aerodynamic surface which has exceptionally high sensitivity and high frequency response.

Other objects of this invention will be pointed out in the following detailed description and claims and illustrated in the accompanying drawings which disclose, by way of example, the principle of the invention and the best mode which has been contemplated of applying that principle.

In the drawings:

FIGURE 1 is a schematic, side elevational view, in section, of an airfoil employing the pure fluid amplifier of the present invention as a stall or shock wave sensor.

FIGURE 2 is a schematic, side elevational view of the airfoil shown in FIGURE 1 with the sensor sensing the stall condition of the airfoil.

FIGURE 3 is a schematic, side elevational view, in section, of an alternate embodiment of the present invention for sensing the stall condition of the airfoil or the presence of a shock wave along the surface thereof.

FIGURE 4 is a schematic, side elevational view, in section, of the airfoil shown in FIGURE 3 showing the operation of the fluid amplifier sensor under airfoil stall conditions.

Figure 5:
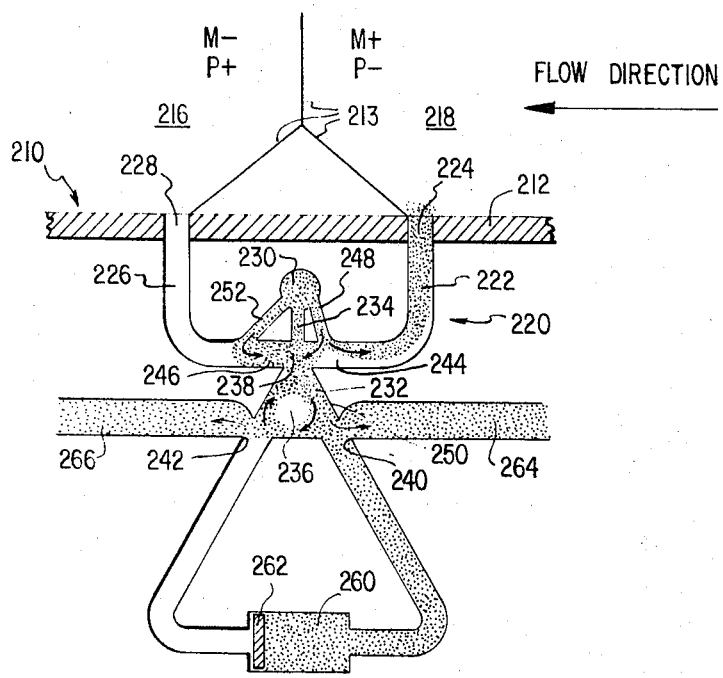
FIGURE 5 is a schematic view of an improved self-biasing pure fluid amplifier for sensing a shock wave appearing in a high velocity compressible fluid passing along the outer wall surface.

In general, the invention is directed to either a stall or shock wave sensing system for a high velocity fluid moving along a reactive surface of an airfoil or the like with the system including a pure fluid amplifier having a sealed amplifier interaction chamber and a power nozzle for directing a power stream into one end of the chamber. The amplifier further includes a pair of fluid outlets to selectively receive the amplifier power stream and means for biasing the power stream from the power nozzle through the chamber to one of the outlets. A control nozzle is coupled to the chamber for directing a control stream in interacting relation to the power stream and means are provided for fluid coupling the control channel to the high velocity fluid moving along the reactive surface, whereby as a result of pressure change in the high velocity fluid, control fluid flow from the control nozzle overcomes the biasing means to cause the power stream to switch from one outlet to the other as an indication of either shock or stall. In one form, the pure fluid amplifier is of the self-biased type including means for diverting a portion of the power stream, upstream of the power nozzle, to the control channel at a point remote from the control nozzle inlet to the chamber, and normally directing the same through the control channel in a direction away from the amplifier interaction chamber.

The present invention, in its most simplified form, is directed to the use of a fluid amplifier for sensing the presence of a stall condition on the aerodynamic surface, or alternatively, for sensing the presence or position of either a normal or oblique shock wave in a compressible fluid.

A pure fluid amplifier, as known in the art, basically comprises a device in which an input fluid or power stream is switched between two or more output channels by the application of control fluid streams at right angles to the main fluid flow. In a pure fluid amplifier of the wall attachment type, the main fluid flow attaches to a wall of an output channel of the device due to a pressure differential that exists across the fluid as it flows. There is normally a high pressure on the outer side of the flowing fluid as it moves than the inner side that is attached to the wall of the output channel. While the present invention is shown in the embodiments of FIGURES 1 and 2 and the embodiment of FIGURES 3 and 4 is a wall attachment amplifier, other types of bistable fluid amplifiers may be readily employed. In switching the wall attachment, bistable amplifier shown in these two embodiments, a fluid flow is directed at approximately 90° to the inner side of the main fluid flow, thereby eventually increasing the pressure on the side that is attached to the output channel wall. As soon as the pressure becomes high enough, the fluid flow switches to the opposite channel and a pressure differential then holds the flowing fluid against the wall of the opposite channel. Since the amount of fluid introduced at right angles to the main flowing fluid is small compared to the main fluid volume, said device is considered an amplifier. In the present invention, it is the bistable action of the fluid amplifier which is important since it is the change in position of the power stream which is used as an indication of the presence of a stall condition or a shock wave position along the surface over which the high velocity fluid passes.

Referring to FIGURE 1, there is shown schematically, in cross-section, an airfoil 10 which may, for instance, comprise a wing or like suspension member for an aircraft. The airfoil 10 is provided with a curved, aerodynamic surface 12 over which a high velocity fluid passes in the direction shown by arrows 14. Under normal circumstances, the flow of fluid over airfoil surface 12 is such that the fluid closely hugs the surface and moves from the leading edge 16 toward trailing edge 17. The angle of attack of the airfoil 10, in FIGURE 1, is at zero degrees with the plane of the airfoil being generally horizontal.

The stall sensing means for the airfoil comprises a pure fluid amplifier element 18 of the conventional wall attachment type which is shown schematically as including an inlet port 20 associated with inlet nozzle 22 for directing a power stream 24 toward diverging upper and lower outlets 26 and 28. Outlets 26 and 28 are separated by inner converging walls 30 and 32 of splitter 34. In moving from the inlet nozzle 22 to fluid outlets 26 and 28, the power stream 24 moves across amplifier interaction chamber 36. At the point of exit of the power stream 24 from the inlet nozzle 22 within chamber 36, there is provided a rather large diameter control nozzle 38 in tubular form which opens up to the atmosphere internally of the wing or airfoil 10. An upper control nozzle 40 is inclined forwardly of the airfoil and is of lesser diameter than the diameter of control nozzle 38. The upper control nozzle 40 extends from interaction chamber 36 to the upper airfoil surface 12. The upper control nozzle 40, therefore, faces toward the airflow passing over surface 12 of the wing 10. The bistable, pure fluid amplifier 18 is biased such that the power stream flow is normally directed to outlet 26 in the absence of relative speed between the airfoil and the air surrounding it by providing a larger diameter control nozzle 38 than the upper control nozzle 40 and connecting the bottom control nozzle to the atmosphere. The biasing of the power stream 24 to a preferred outlet may also be achieved by asymmetry in the side walls of outlets 26–28 or by a small fluid signal applied to a particular control nozzle.

With the larger diameter control nozzle 38 open to the atmosphere, the flip-flop or bistable device 18 is initially biased toward the upper side wall of the interaction chamber, with the power jet 24 passing from the inlet nozzle to outlet 26. When the flow over the wing reaches sufficient relative velocity, the flow 14' into the control nozzle 40 will cause the biased flip-flop 18 to flip to the opposite outlet 28, as shown. Thus, at high velocity, with the attitude of the airfoil horizontal or nearly horizontal, in the instant application, the power stream will continue to pass through outlet 28. As the angle of attack increases and the wing approaches stall conditions (FIGURE 2), there is no longer flow parallel to the upper surface 12 of the airfoil. The high velocity air upon impinging the leading edge 16 of the airfoil passes upwardly and over the edge but tends to move generally horizontal, as indicated by arrows 14''. In fact, over the central area of the upper airfoil surface 12, there is a tendency for flow to actually reverse direction, as indicated by arrow 42, causing turbulence, as indicated at 44. In response to flow reversal or the decrease in flow into the forwardly curved control port 40, the positive pressure within control nozzle 40 ceases and flow will be entrained from this control port. The bias on the flip-flop exerted by the larger diameter control nozzle 38 now returns the power jet from nozzle 28 to nozzle 26. Appropriate means are provided for sensing the position of the control jet 24 with respect to either outlet 26 or 28. The upper and lower outlets 26 and 28, respectively, are coupled into a common loop by an enlarged diameter chamber section 50. Chamber 50 carries indicator piston 52 which is freely movable to either an extreme up or down position depending upon which outlet is receiving the power stream. The lower power stream outlet 28 is provided with a fluid relief port 54, while the upper power stream outlet 26 is provided with a relief port 56. Under normal operation, the presence of fluid in the lower outlet 28 causes the piston 52 to move upwardly within chamber 50, thus providing an indication of no stall. By reference to FIGURE 2, as the airfoil approaches stall position, the power stream will flip from the lower outlet 28 to the upper outlet 26 causing the piston 52 to be biased in its lower extreme position with respect to cylinder 50, thus indicating stall condition. Obviously, as soon as the airfoil moves from the inclined position shown back toward the horizontal, the appearance of sufficient fluid from the airstream over surface 12 into the upper control nozzle 40 will again deflect the power stream back into nozzle 28, causing piston 52 to return to its uppermost position within chamber 50 to thereby indicate stall free conditions.

An alternate approach is shown in FIGURES 3 and 4. In this embodiment, the pure fluid amplifier is again used as a bistable device to sense the movement of the airfoil into stall position. However, the upper control port, instead of facing forwardly toward the oncoming high velocity fluid passing over the upper airfoil surface, now faces away from the direction of the flow over the wing. Wing 110 is provided with a pure fluid amplifier 118 of the bistable, wall attachment type which again incorporates a power stream delivery port 120 opening up into a power stream inlet nozzle 122 which passes through an interaction chamber 136 to either upper outlet 126 or lower outlet 128. In the absence of high velocity fluid, as indicated by arrow 114, sufficient bias is provided by the large diameter upper control nozzle 140, as contrasted to smaller diameter lower control nozzle 138, to cause the power stream 124 to move from inlet nozzle 122 through interaction chamber 136 to outlet 128. The flow of high velocity fluid over the upper airfoil surface 112 of the wing, as indicated by arrows 114, is sufficient to entrain fluid from the upper control nozzle 140, as indicated by arrow 114, which, therefore, flips the stream causing it to move from the lower outlet 128 to the upper outlet 126. Under stall conditions, as indicated in FIGURE 4, the high velocity fluid 114 no longer passes over the center of the upper airfoil surface 112 and in fact, some flow reversal occurs as indicated by arrow 142 at the trailing edge 117 of the wing. The relative increase in pressure along the upper airfoil surface in the vicinity of the control port 140 terminates the entrainment of fluid from the upper control nozzle 140 and the bias provided by the larger diameter upper nozzle 140 will flip the power stream 124 from the upper outlet 126 to the lower outlet 128. The return of the power stream to its original position is indicative of the approach of the airfoil to the stall condition and conventional means (not shown) may be employed for sensing the return of the stream as an indication of stall. The indicator means could comprise a movable piston identical to the arrangement of FIGURES 1 and 2.

When partial stall is encountered, such as on a helicopter rotor or on turbine blades, several pure fluid bistable devices can be used in critical areas. The flows from the outputs of the flip-flops may be combined; thus, as some of the flip-flops encounter stall, the streams will flip. The reduction in flow may be measured with a flowmeter or the like to determine the extent of the stall region. Further, the application of pure fluid amplifiers of the bistable type may be readily used to detect the presence of a normal or oblique shock wave in striking a wall or other surface. The shock wave, in a compressible fluid, is characterized by the supersonic flow changing direction in the case of an oblique shock and in a normal shock, the slowing to Mach 1 with a consequent rise in pressure in both cases. For instance, using the same type of system as shown in the embodiment of FIGURES 3 and 4, with a low pressure in the control nozzle 140 due to entrainment, as a result of the presence of a normal or oblique shock wave, an increased pressure would cause the bistable element to change sides, readily indicating the presence of the shock wave.

Figure 6:
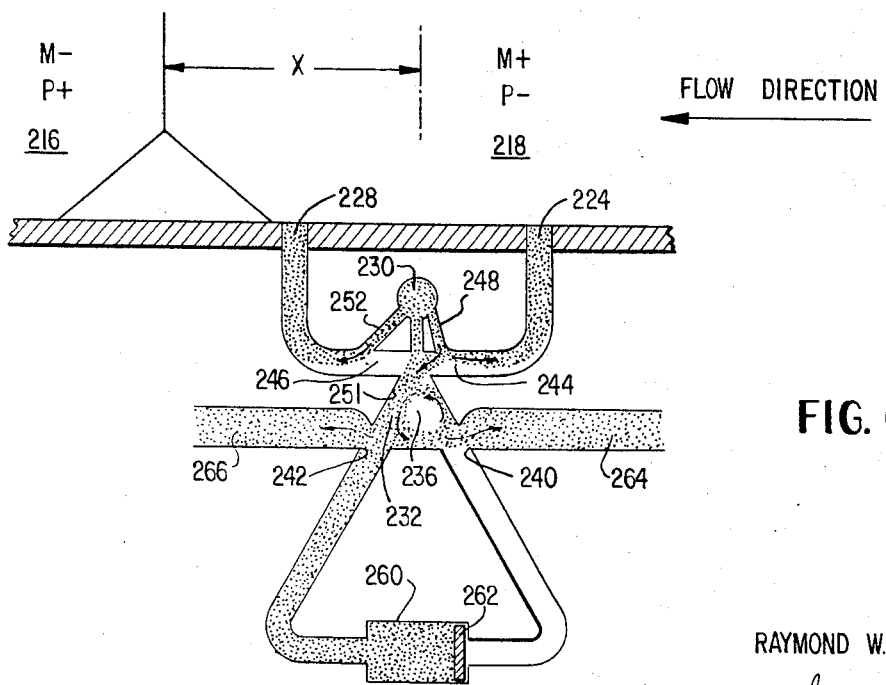
FIGURE 6 is a schematic view of the fluid amplifier shock wave sensor of FIGURE 5 during sensing of a shock wave.

The present invention has particular application to an improved self-biasing fluid amplifier of the type shown in copending United States application Ser. No. 588,677, filed Oct. 16, 1966, entitled "Self-Biasing Fluid Amplifier," by Elmer Swartz. FIGURES 5 and 6 show the application of the self-biasing fluid amplifier for sensing the position of a normal shock wave along a wall or like member. Referring to the drawings, there is shown a planar member 210 having a high velocity fluid flowing along the outer surface 212, as indicated by arrow 214. Under normal circumstances, a standing wave pattern is formed, as indicated by lines 213, which is characterized by an area of positive pressure 216, to the left, and an area of reduced pressure 218 to the right thereof. The velocity of the fluid to the left is below Mach 1, while the velocity of the fluid to the right of the wave pattern is above Mach 1. A pure fluid amplifier 220 of the self-biasing type is shown schematically connected by means of right control channel 222 to the reduced pressure area 218 through a control port 224 opening onto the outer surface 212 of the planar member. Left-hand control port 226 is coupled to the positive pressure area 216 on the opposite side of the shock wave through control port 228 which opens up onto the outer surface 212 of the planar member. The self-biased pure fluid amplifier 220 includes, in conventional fashion, a power stream port 230 for directing the main portion of power stream 232 through a power stream nozzle 234. The power stream enters the upstream end of fluid amplifier interaction chamber 236 at the power stream nozzle inlet 230. Right and left-hand power stream outlets 240 and 242 are provided at the downstream end of the interaction chamber in conventional fluid amplifier fashion. The right-hand control channel 222 terminates in a right-hand control nozzle 244 which is fluid coupled to the interaction chamber 236 at right angles to the axis of the main power stream entering the chamber. Likewise, the left-hand control channel 226 terminates in a left-hand control nozzle 246, coupled to the left-hand side of the interaction chamber 236 adjacent power nozzle inlet 238. Control nozzles 244 and 246 are axially aligned on opposite sides of the power stream. Right-hand bias slot 248 is connected to the power stream inlet port 230, and acts to by-pass a small portion of the power stream into the right-hand control channel 222 at a point remote from the interaction chamber. The bias slot 248 is inclined with respect to the control channel 222 such that the major portion of the bias flow readily passes from the bias channel into the control channel away from the interaction chamber. A small portion flows from the bias channel inlet, through control nozzle 246 toward the interaction chamber 236 to normally bias the power stream 232 toward right-hand outlet 242.

The self-biased fluid amplifier 220 is further provided with a left-hand bias channel 252 which has one end fluid coupled to the power stream upstream of interaction chamber 236 and the other end coupled to left-hand control channel 226. In like manner to bias channel 248, channel 252 is inclined, but to a greater extent than channel 248, and opens up into the control channel. The small volume of power stream fluid, which is by-passed through bias channel 252, enters the left-hand control channel and normally flows away from the interaction chamber toward control channel outlet port 228 in the absence of a control signal pressure. This also tends to bias the power stream toward outlet channel 242. However, since a positive or higher pressure area 216 momentarily exists at the port opening 228 in contrast to port 224, the positive pressure acts oppositely to the bias flow passing through bias channel 252 and tends to deflect the bias flow back through left-hand control nozzle 246 and into the interaction chamber 236. The impact of the reversed bias flow on the left-hand side of the power stream 232 within left-hand control nozzle 246 overcomes the bias flow in right-hand control nozzle 244 to ensure flow of the power stream from power stream nozzle inlet 238 through interaction chamber 236 along the right-hand wall 250 of the chamber and into the right-hand power stream outlet 240.

Similar type indicator means are provided for indicating the shift in position of the shock wave as it moves relative to the planar surface 210. An enlarged cylindrical chamber section 260 joins left and right-hand outlets 242 and 240. The chamber section 260 carries a reciprocating indicator piston 262. Again, the change in the position of the piston 262 within chamber 260 is indicative of the shift in position of the shock wave relative to the planar surface.

In like manner to the previous embodiments, bleed channels are provided for the indicator portion of the system. For instance, right-hand bleed channel 264 is coupled to the interaction chamber 236 at the downstream end and to the right of outlet channel 240. Likewise, left-hand bleed channel 266 is coupled to the interaction chamber to the left of outlet 242 and in line with right-hand bleed channel 264. In the absence of a control pressure differential across control ports 224-228, the flow of biasing fluid through both right and left-hand bias channels 248 and 252 would normally have an equal and opposite effect on the power stream 232. There is need to initially bias the power stream to either the right or left-hand outlet 242 or 240, as desired. As indicated, a light biasing pressure is continuously applied to the right-hand control nozzle 244 which in the absence of a control signal differential across the control channels, tends to maintain the power stream 232 in the left-hand outlet channel 242 causing the indicator piston 262 to maintain its extreme right-hand position with respect to chamber 260.

Reference to FIGURE 6 shows the effect of a downstream movement of the shock wave a distance X, as indicated by the arrows. This tends to shift the higher pressure area 216 to the left, with both control outlets 224 and 228 seeing the lower pressure area 218, eliminating a pressure differential across the control ports. The biasing flow through bias channels 248 and 252 creates a low pressure area within control nozzle 246, while the portion of bias flow returning to interaction chamber 236 through right-hand control nozzle 244 causes the power stream to flip back to outlet 242. This will cause the piston or shock wave indicator to move from its extreme left-hand position to the extreme right-hand position shown with the power stream hugging the left-hand side wall 251 of chamber 236, indicating movement of the shock wave beyond ports 224–228. After shifting the piston 262, the power stream will continue to pass out of left-hand and right-hand bleeds 266 and 264, as indicated. Of course, the biasing force which is continually present in control nozzle 244 must have materially less effect on the power stream 232 than the effect of a control signal being applied to either the left or right-hand channels 222 or 226.

The utilization of the improved, self-biasing fluid amplifier provides exceptional high sensitivity to the shock sensor itself and operates most satisfactorily in this environment. The fluid amplifier enjoys a high input impedance and the only requirement for switching is the application of the relatively low pressure to the control channels resulting in reverse movement of the power bleed from a direction away from the power stream to a direction toward the power stream within the control channel and causing the deflection of the main section of the power stream. While the lower pressure area 218 tends to entrain fluid from the control channel or passage 222, the system does not really require entrainment but merely the application of sufficient positive pressure to cause the power bleed in a bias slot to reverse itself within the control channel and move toward the main portion of the power stream entering the amplifier chamber. Further, while in all three embodiments, the fluid amplifiers and their environmental structure are shown schematically, it is readily apparent that the pure fluid amplifier devices, including the shifting piston indicator means may be formed in conventional fashion, from a series of stacked plates or the like provided with appropriate fluid passageways and an amplifier interaction chamber formed by molding, etching or other suitable techniques. A channeled, central plate may be covered by imperforate outer plates so that the various passageways, ducts, nozzles, etc., are enclosed and sealed in a fluid-tight relationship between the two outer plates. The manner in which the pure fluid amplifier elements are constructed and the specific means to indicate the shock wave or stall conditions after sensing forms no part of the present invention.

What is claimed is:

1. An improved, fluid actuated stall sensing system for an airfoil having a high velocity fluid passing over a reactive surface carried thereby, said system comprising: a pure fluid amplifier including a sealed amplifier interaction chamber, a power nozzle coupled to said chamber for directing a power stream into one end of said chamber, a pair of fluid outlets coupled to the other end of said chamber for selectively receiving said power stream, means for biasing said power stream into one of said outlets and a first control channel having one end fluid coupled to said amplifier interaction chamber intermediate of said power nozzle and said outlets, and having the other end of said control channel opening up onto the reactive surface and communicating with the atmosphere, whereby in response to stall conditions, the absence of fluid flow in the vicinity of said airfoil surface opening causes the control stream within said control channel to overcome said bias and to switch said power stream from said one outlet to said other outlet as an indication of stall.

2. The stall sensor as claimed in claim 1 wherein said first control channel is inclined in a direction away from said oncoming high velocity fluid so as to entrain fluid within said control channel, and said biasing means tends to bias the power stream into the outlet on the opposite side of said interaction chamber as said first control channel.

3. The stall sensor as claimed in claim 2 wherein said biasing means comprises a second control channel on the opposite side of said power stream as said first control channel, said second control channel having a diameter less than the diameter of said first control channel and means coupling said second control channel to atmosphere.

4. The stall sensor as claimed in claim 1 wherein said control channel is inclined in a direction toward said oncoming high velocity fluid to positively pressurize the same, and said biasing means tends to bias the power stream into the outlet on the same side of the interaction chamber as said first control channel.

5. The stall sensor as claimed in claim 4 wherein said biasing means comprises a second control channel on the opposite side of said power stream from said first control channel, said second control channel being of a larger diameter than said first control channel and opening internally of said airfoil.

6. An improved fluid actuated shock sensor for sensing the presence of a shock wave in a compressible fluid moving along a planar surface, said sensing system comprising: a pure fluid amplifier including a sealed amplifier interaction chamber, a power nozzle coupled to said chamber for directing a power stream into one end of said chamber, a pair of fluid outlets coupled to the other end of said chamber for selectively receiving said power stream, control chanels each having a control nozzle coupled to said interaction chamber between said power nozzle and said fluid outlets and having the other end opening up onto said planar surface, bias slot means for each control channel, means for connecting each bias slot to said power stream upstream of said power nozzle and to its respective control channel at a point intermediate of said nozzle inlet and said planar opening, each bias slot being inclined with respect to its control channel axis to normally pass a portion of said power stream through the control channel in a direction away from said amplifier interaction chamber thereby tending to self-bias the main power stream to the outlet on the same side of said chamber as the control channel, whereby, in response to a shock wave movement, a momentary pressure differential across said control channel openings causes the portion of said power stream passing through said bias slot to reverse its direction within one of the control channels and to thereby deflect the power stream to the outlet remote therefrom.

7. The shock sensor as claimed in claim 6 wherein one of said bias slots is inclined with respect to its control channel to a lesser extent than said other bias slot whereby a portion of said bias flow normally passes into said control channel toward said amplifier interaction chamber to self-bias said power stream to the outlet on the side of the chamber opposite said lesser inclined biased slot.

8. The shock sensor as claimed in claim 6, further including means for coupling said power stream outlet to opposite ends of an enlarged diameter indicator chamber, means for freely positioning a piston within said chamber whereby said piston moves to the end of said chamber opposite the end receiving the incoming power stream, whereby a change in position of said piston within said chamber is indicative of the presence of said shock wave.

9. The shock sensor as claimed in claim 8 further including bleed slots coupled to respective power stream outlets between said power stream inlet nozzle and said indicator chamber to allow power stream bleed upon seating of said piston indicator at the end of said indicator chamber.

References Cited

UNITED STATES PATENTS

| | | | |
|---|---|---|---|
| 2,590,521 | 3/1952 | Dyche | 73—180 |
| 3,006,187 | 10/1961 | Wilkenson | 73—180 |
| 3,137,464 | 6/1964 | Horton | 137—81.5 XR |
| 3,171,422 | 3/1965 | Evans | 137—81.5 |
| 3,327,529 | 6/1967 | Bowles et al. | 244—78 XR |
| 3,331,379 | 7/1967 | Bowles | 137—81.5 |
| 3,362,422 | 1/1968 | Toma | 137—81.5 |
| 3,367,581 | 2/1968 | Kizilos et al. | 137—81.5 XR |

SAMUEL SCOTT, *Primary Examiner.*

U.S. Cl. X.R.

73—180; 137—81.5